(12) United States Patent
Strangeland et al.

(10) Patent No.: US 6,809,683 B2
(45) Date of Patent: Oct. 26, 2004

(54) PORTABLE TESTER FOR LAAS GROUND FACILITY

(75) Inventors: Rodney L. Strangeland, Plymouth, MN (US); Gary J. Wolanin, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/298,789

(22) Filed: Nov. 18, 2002

(65) Prior Publication Data

US 2004/0095271 A1 May 20, 2004

(51) Int. Cl.$^7$ ................................................. G01S 5/14
(52) U.S. Cl. ............................ 342/357.02; 342/357.03; 342/358
(58) Field of Search ............................. 342/357.01–358

(56) References Cited

U.S. PATENT DOCUMENTS

| | | | | |
|---|---|---|---|---|
| 5,436,632 A | * | 7/1995 | Sheynblat | 342/357.03 |
| 5,786,773 A | | 7/1998 | Murphy | 340/947 |
| 5,831,576 A | * | 11/1998 | Sheynblat | 342/357.03 |
| 5,969,670 A | * | 10/1999 | Kalafus et al. | 342/357.02 |
| 2001/0020214 A1 | * | 9/2001 | Brenner | 342/357.02 |

OTHER PUBLICATIONS

C.C. Hawes et al., The local area augmentation system: an airport surveillance application supporting the FAA Runway Incursion Reduction Program demonstration at the Dallas/Fort Worth International Airport, Proceedings of the 20th Digital Avionics Systems Conference, vol. 1, p. 2.E.2–1 to 2.E.2–10, Oct. 2001.*
S. Aab, Runway Incursion Prevention Runway Incursion Prevention System, http://dependability.cs.virginia.edu/bibliography/NASA RIPS POT TALK.pdf, Apr. 2001.*
R. Thomas et al., The Local Area Augmentation System: An Airport Surface Guidance Application Supporting the NASA Runway Incursion Prevention System Demonstration at the Dallas/Fort Worth International Airport, Proceedings of the 20th Digital Avionics Systems Conference, Oct. 2001.*
V. Wullschleger, et al. "FAA LAAS Specification: Requirements for Performance Type 1," European Institutes of Navigation GNSS 2000 Conference, May 2000.
United States Department of Transportation Federal Aviation Administration, Specification FAA–E–2937A Category I Local Area Augmentation System Ground Facility Apr. 17, 2002.

* cited by examiner

Primary Examiner—Gregory C. Issing
Assistant Examiner—Fred H Mull
(74) Attorney, Agent, or Firm—McDonnell Boehnen Hulbert & Berghoff LLP (57) ABSTRACT

A portable tester verifies the operational status of a satellite-based navigation ground facility. The portable tester includes a receiver and a computer. In a preferred embodiment, the receiver obtains Global Position System (GPS) signals from a plurality of satellites and Very High Frequency (VHF) broadcasts from the ground facility. The computer compares the data obtained from the receiver with expected results and determines if the ground facility is operational if not operational, the computer determines a subsection of the ground facility causing the failure. If the ground facility is not operating properly, it may not transmit the proper differential corrections and glidepath information to an aircraft. As a result, a pilot may not receive accurate information regarding the aircraft's position. This may result in landings that do not closely follow a prescribed glidepath, which could be disastrous. By using the portable tester, the ground facility can be tested to ensure proper data will be sent to the aircraft.

28 Claims, 4 Drawing Sheets

PORTABLE TESTER FOR LAAS GROUND FACILITY

FIELD

The present invention relates generally to satellite-based landing navigation systems, and more particularly, relates to a portable tester designed to verify the operational status of a ground facility of the satellite-based landing navigation system.

BACKGROUND

Pilots typically use landing navigation systems when they are landing an aircraft. These systems assist the pilot in maintaining the aircraft along a predetermined glidepath associated with a particular landing strip or runway. In general, ground-based navigation systems are employed. Two common ground-based navigation systems currently in use are the Instrument Landing System (ILS) and the Microwave Landing System (MLS).

Due to limitations in the ILS and MLS Systems, including cost and single approach limitations, the Federal Aviation Administration (FAA) is currently transitioning the National Airspace System (NAS) from ground-based navigation systems to satellite-based navigation systems. In this endeavor, the FAA, with assistance from industry, is developing a Local Area Augmentation System (LAAS) to provide a satellite-based landing solution designed to assist pilots during approach and landing of an aircraft.

The LAAS uses a differential global positioning system (DGPS). The DGPS includes a global positioning system (GPS) and at least one ground station. The GPS uses a number of orbiting satellites and a receiver on an aircraft to determine the position of the aircraft with respect to ground. With the satellite information, the receiver can determine the position, speed, and altitude of the aircraft. By adding a ground station, the DGPS can correct errors that may occur in the transmission of data from the satellites to the receiver. As a result, the DGPS can determine the position of the aircraft with a high degree of accuracy.

In 1998, the FAA initiated a program to develop requirements for developing and deploying a LAAS Ground Facility (LGF). The LGF will monitor the satellite constellation, provide LAAS corrections and integrity data, and interface with air traffic control. As a result of this program, the FAA released Specification FAA-E-2937A for a Category I LGF on Apr. 17, 2002, the contents of which are incorporated by reference. This specification establishes the performance requirements for the LGF.

After the LAAS is installed at an airport, the system needs to be certified as operational before pilots can rely on the LAAS to provide approach and landing guidance. Test flights are required to certify the system. During the test flights, test pilots land aircraft that are not currently being operated for commercial purposes (e.g., transporting goods and/or people) using the LAAS. The LAAS data from the test flights is compared to data from an FAA approved truth system to ensure that the test pilot received accurate glidepath information.

These test flights are very expensive and can be dangerous if the pilot receives erroneous information. If the test flight indicates problems with the LAAS, additional test flights will be required. Therefore, it would be desirable to have a portable tester that can verify LGF operability prior to performing a test flight. Once the LAAS has been certified and is operational at an airport, it is also desirable to have a portable tester to perform routine maintenance tests on the LGF.

SUMMARY

A portable tester for testing a satellite-based navigation system ground facility is provided. In a preferred embodiment the portable tester includes a receiver and a computer. The receiver is operable to receive both Global Positioning System (GPS) signals from a plurality of satellites and Very High Frequency (VHF) broadcasts from a ground facility. The computer is operable to tune the receiver and select a glidepath for a particular runway. The computer can then determine whether the ground facility is operational by comparing the GPS signals and VHF broadcasts obtained by the receiver with expected results.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

Figure 1:
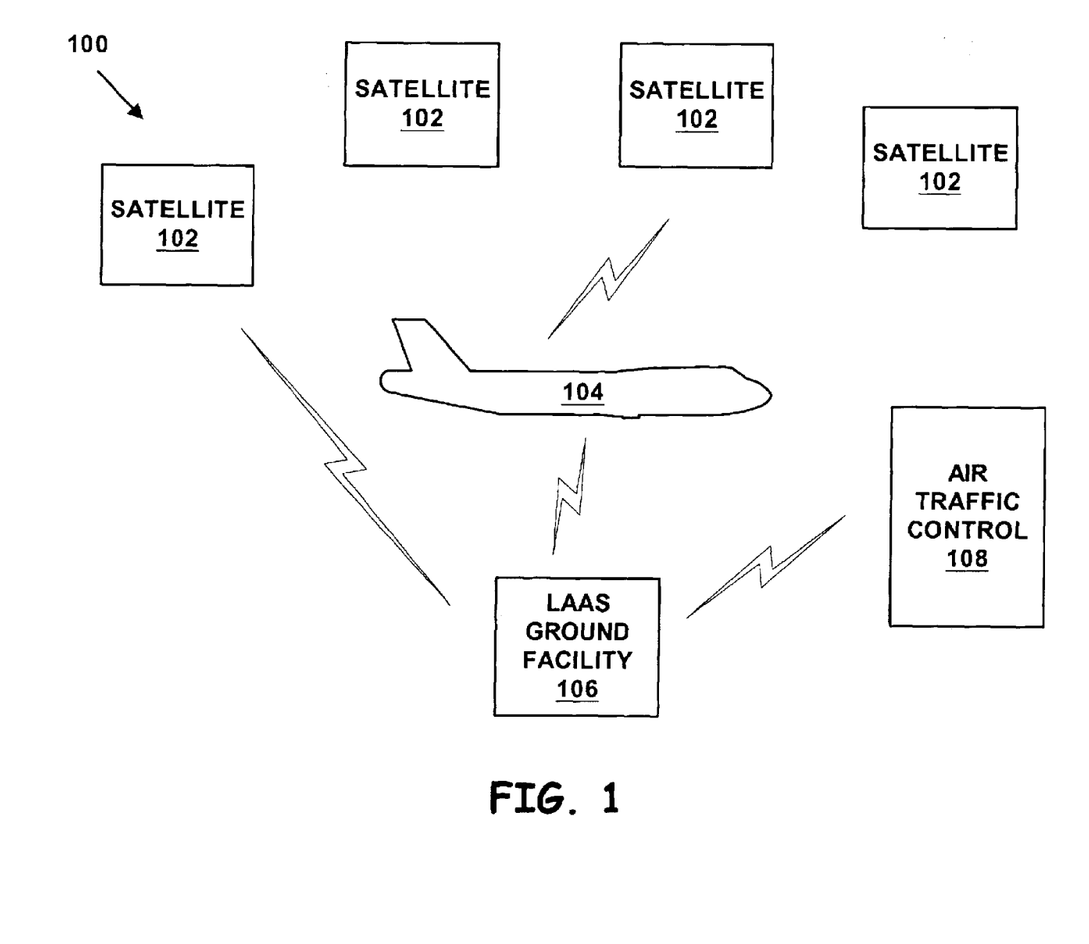
FIG. 1 is a block diagram of a LAAS, according to an exemplary embodiment.

FIG. 1 is a block diagram of a Local Area Augmentation System (LAAS) 100, which augments a global positioning system (GPS). The LAAS 100 includes a plurality of satellites 102 and a LAAS Ground Facility (LGF) 106 for providing precision approach and landing data to an aircraft 104. The LAAS 100 preferably includes four or more satellites. While FIG. 1 depicts four satellites 102, the LAAS 100 may include more or less than four satellites.

The plurality of satellites 102 may provide the aircraft 104 and the LGF 106 with GPS ranging signals and orbital parameters. The aircraft 104 and the LGF 106 may each use a GPS receiver to receive the data from the satellites 102. After analyzing the data from the satellites 102, the LGF 106 may provide differential corrections, integrity parameters, and precision approach glidepath data to the aircraft 104. The aircraft 104 may use a Very High Frequency (VHF) receiver to receive the data from the LGF 106. The aircraft 104 may apply the differential corrections to the GPS ranging signals obtained from the satellites 102 to accurately determine its position.

The position and glidepath data may be provided to an aircraft autopilot. The autopilot may display the glidepath on a cockpit display. The glidepath, otherwise known as a final approach segment, is a line in space that the aircraft 104 should preferably follow as the aircraft 104 approaches and lands on a runway. The glidepath is typically designed so that the aircraft 104 will land on the centerline of the runway. The difference in depth of modulation (DDM) is the difference between the aircraft's position and the glidepath, in both the vertical and the horizontal direction. If the aircraft 104 precisely tracks the glidepath, the DDM equals zero, and the aircraft 104 will land on the centerline.

In addition, the LGF 106 may provide status information to air traffic control 108 via an Air Traffic Control Unit (ATCU). For example, LGF 106 may provide the air traffic control 108 with LAAS status, LAAS configuration, LAAS coverage, the level of service provided in this coverage area, and the status of the satellites 102. The LGF 106 may also provide other status information to the air traffic control 108. LGF status information may also be available on a Local Status Panel (LSP) located on the LGF 106.

Figure 2:
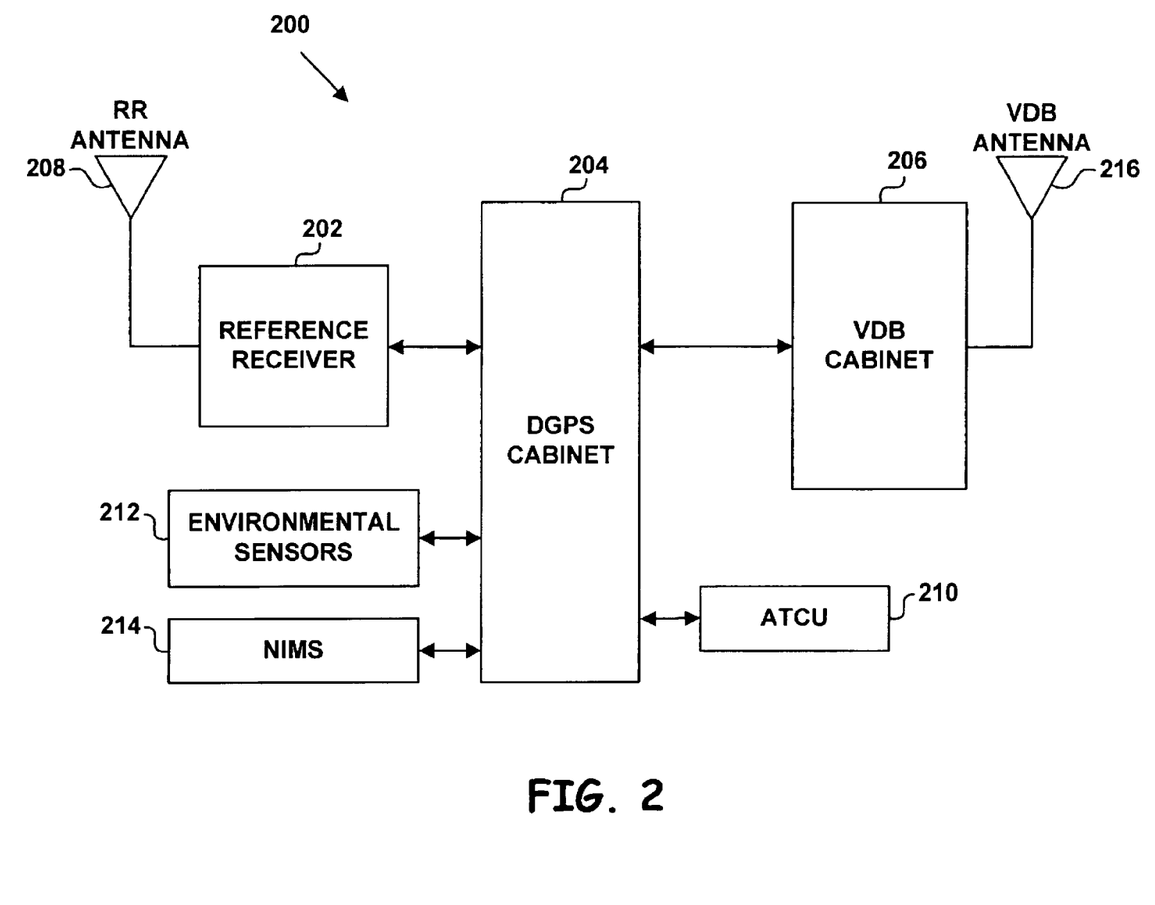
FIG. 2 is a block diagram of a LGF, according to an exemplary embodiment.

FIG. 2 depicts a block diagram of a LGF 200. The performance requirements of the LGF 200 are documented in FAA Specification FAA-E-2937A for a Category I LGF dated Apr. 17, 2002, the contents of which are incorporated by reference. The LGF 200 may include a plurality of reference receivers 202, a DGPS cabinet 204, one or more VHF Data Broadcast (VDB) cabinets 206, and associated antennas. The LGF 200 may receive inputs from environmental sensors 212. In addition, the LGF 200 may receive inputs from and provide data to a National Airspace System (NAS) Infrastructure Management System (NIMS) 214 and an ATCU 210. The LGF 200 may include additional components not depicted in FIG. 2.

Each of the reference receivers 202 may include a GPS receiver, which may obtain information from the plurality of satellites 102 using an antenna 208. The reference receivers 202 may also include a power supply and additional components. The LGF specification requires four reference receiver 202/antenna 208 pairs to be used in the LGF 200. By using redundant reference receivers in the LGF 200, fault detection and isolation of a failed reference receiver may be performed. In addition, the use of redundant reference receivers may increase the accuracy of the LGF 200.

The DGPS cabinet 204 may include a Maintenance Data Terminal (MDT), an LSP, a data recorder, computer processing resources (e.g., microprocessor, memory, input/output control circuitry), and other operational devices, such as power supplies. The DPGS cabinet 204 may also include additional components.

The DGPS cabinet 204 may communicate with the reference receiver 202, the VDB cabinet 206, the ATCU 210, the environmental sensors 212, and the NIMS 214. The DGPS cabinet 204 may receive the satellite data from the reference receiver 202 and calculate the differential corrections. The differential corrections may then be communicated to the VDB cabinet 206 for transmitting the corrections to the aircraft 104. The DGPS cabinet 204 may also communicate other information, such as integrity parameters and precision approach glidepath data, to the VDB cabinet 206 for transmission to the aircraft 104. In addition, the DGPS cabinet 204 may provide status information to the air traffic control 108 via the ATCU 210.

The data recorder may record signals received and transmitted by the LGF 200. For example, the data recorder may record data received from the satellites 102 and data transmitted to the aircraft 104. The data recorder may use non-volatile memory to store the data. The data recorder may record data for a period of time, such as forty-eight hours. However, the period of time may be more or less than forty-eight hours depending on the capacity of the data recorder and/or design specifications. Data from the data recorder may be used when historical information is needed, such as after a satellite 102, the aircraft 104, or the LGF 200 experiences problems.

The NIMS 214 may allow for remote monitoring and prioritization of maintenance activities. If the NIMS 214 detects a failure in the LGF 200, FAA maintenance personnel may be dispatched to investigate the problem.

The MDT may be the primary means for FAA maintenance personnel to interact with the LGF 200. The MDT may be a computer designed to operate in an industrial setting. The MDT may be connected to the LSP. The LSP may provide a visual indication of the operational status of the LGF 200. For example, the LSP may activate a green indicator when the LGF 200 is in normal operating mode. The environmental sensors 212 may be used to detect intrusion, smoke, loss of power, and temperature, both inside and outside the LGF 200.

The VDB cabinet 206 may include a transmitter, a receiver, a multiplexer, a status panel, and a power system. The VDB cabinet 206 may also include additional components. The LGF 200 may include more than one VDB cabinet 206. The number of VDB cabinets used may be determined by the amount of coverage required at a given airport or runway.

The VDB cabinet 206 may communicate with the DGPS cabinet 204 and the aircraft 104. The VDB cabinet 206 may communicate with the aircraft 104 using a VDB antenna 216. The communications may be transmitted using VHF data broadcast. The LGF specification requires that the VDB antenna 216 provide an omni-directional signal. In addition, the Specification includes other transmission requirements for the VDB signals, such as strength and frequency requirements.

Figure 3:
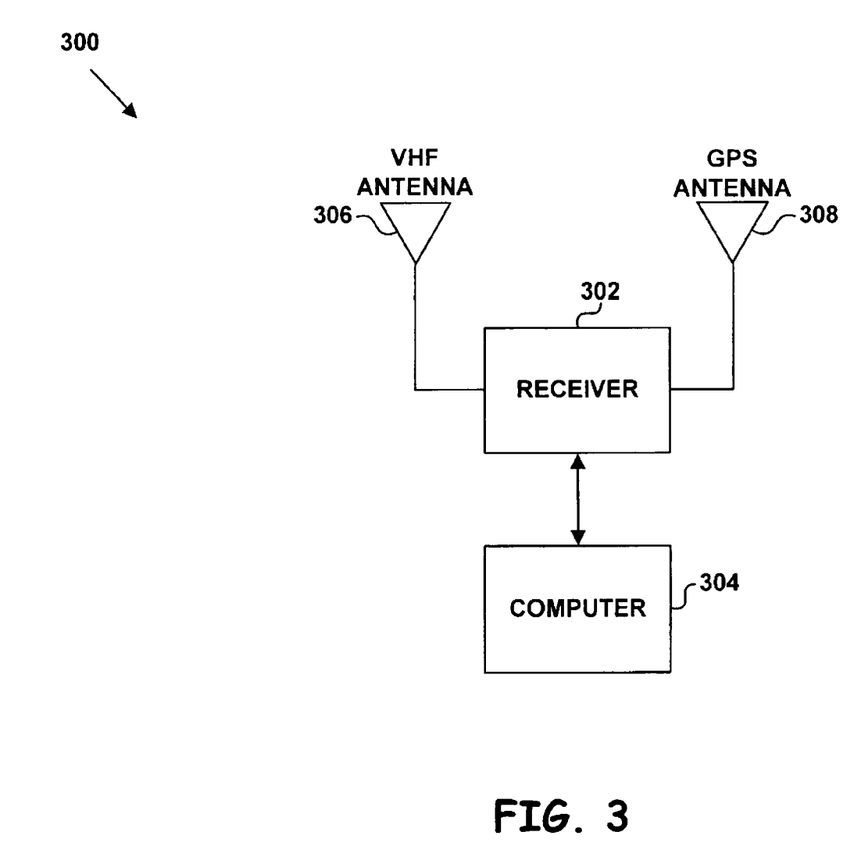
FIG. 3 is a block diagram of a LGF portable tester, according to an exemplary embodiment.

FIG. 3 is a block diagram of a LGF portable tester 300, which may be used to test the LGF 200. The portable tester 300 includes a receiver 302 and a computer 304. The receiver 302 may include both a VHF antenna 306 and a GPS antenna 308. The portable tester 300 may also include a battery or other self-contained power supply that allows the portable tester 300 to be moved without being connected to an external power source. For example, an external power source may include a power source located in a building, a vehicle, or a portable supply that is not part of the portable tester 300. However, the portable tester 300 may be connected to such a power source between testing events to recharge the batteries or other self-contained power supply.

The portable tester 300 may be designed so that it can be easily moved around an airport, a runway, or other areas in which satellite-based navigation systems may be used to verify the operational status of the LGF 200. For example, the portable tester 300 may be assembled into an integrated package, such as a backpack or a suitcase. Other packaging that allows for easy transportation of the portable tester 300 may also be used.

A person with the portable tester 300 may move from one side of a runway to the other and along the centerline of the runway. As the person moves from one side of a runway to the other, the portable tester 300 may display the magnitude and polarity of the DDM in the horizontal direction changing. Similarly, as the person moves along the centerline of the runway, the portable tester 300 may display the magnitude and polarity of the DDM in the vertical direction changing.

The person may be the installer of the LGF 200, a contractor, an FAA employee, or a robot, for example. Ideally, a single person may operate the portable tester 300; however, additional people may participate in the test. For example, a contractor may operate the portable tester 300, while an FAA employee may monitor the results. It may also be advantageous to have more than one person performing the test for safety reasons.

The receiver 302 may contain a combination of hardware, firmware, and/or software capable of receiving data from both the plurality of satellites 102 and the LGF 200. The data from the plurality of satellites 102 may include GPS data.

The data from the LGF 200 may include VHF broadcasts. The receiver 302 may be an integrated VHF data link and GPS receiver. For example, a multi-mode receiver (MMR) that includes a GPS navigational. unit (GNU) may be used to perform the functions of the receiver 302. In addition, the portable tester 300 may be used for military applications. In a military setting, the receiver 302 may be operable to receive encrypted messages.

The receiver 302 may use the VHF antenna 306 to obtain data from the LGF 200. The data received from the LGF 200 may include data regarding the quality of the VHF data broadcast that the LGF 200 may typically transmit to the aircraft 104. For example, the receiver 302 may obtain data regarding the frequency, integrity, and power of the VHF signal being transmitted by the LGF 200. In addition, the receiver 302 may also capture the differential corrections and glidepath data that the LGF 200 would typically transmit to the aircraft 104.

The receiver 302 may use the GPS antenna 308 to obtain data from the plurality of satellites 102. The portable tester 300 may compare data received from the satellites 102 with data transmitted by the LGF 200. In addition, the portable tester 300 may determine from which satellites the LGF 200 is obtaining data.

The receiver 302 may transmit the satellite data and the LGF data to the computer 304. The computer 304 is preferably a laptop computer, which is lightweight and compact allowing for easy movement of the portable tester 300. However, other computers may be used.

The computer 304 may be used to tune the frequency of the receiver 302 and select a glidepath for a particular runway. There may be more than one glidepath for a runway. For example, a different glidepath may be used for different types of aircraft 104. As another example, a glidepath may be chosen depending on weather and atmospheric conditions. The computer 304 may also be used to simulate the avionics of the aircraft 104. The simulation may be displayed on a monitor associated with the computer 304.

Using the satellite and LGF data, the computer 304 may display an ideal glidepath for a runway. As the person moves away from the ideal glidepath, the portable tester 300 may display how far off the tester is from the glidepath, both in the vertical and the horizontal direction. The difference may be quantified as the DDM. The display may provide horizontal and vertical deviations in a format similar to what the pilot would see on the aircraft's cockpit displays. In addition, the computer 304 may display differential mode, DGPS position versus known position, VHF data messages, and VHF error rates. Software in the computer 304 may be used to create the displays.

The receiver 302 and the computer 304 may communicate using digital communication standard ARINC 429. ARINC 429 is an industry standard for transferring digital data between avionic systems and is used on virtually all commercial aircraft. The ARINC 429 defines the electrical interface, label and address assignments, and the word format description for the digital data. Other digital communication standards may also be used, such as MIL-STD-1553, which is widely used on military aircraft.

The portable tester 300 may verify the following LGF signals: VHF frequency, VHF data integrity, VHF power, GPS satellites tracked, DGPS accuracy, DGPS position integrity, and glidepath. Other LGF 200 signals may also be tested. Verification may occur by comparing the data received from the LGF 200 and the plurality of satellites 102 with a test standard. The test standard may include specific ranges of acceptable data for each LGF signal tested. For example, there may be an upper limit and a lower limit of acceptable values for a particular LGF signal. Alternatively, there may be only an upper limit or only a lower limit of acceptable values. The test standard may be based on the requirements in the Specification FAA-E-2937A for a Category I LGF. Alternatively, the test standard may include limits of acceptable values that are more demanding than the Specification to ensure optimal operation of the LGF 200.

The test results may indicate that one or more of the LGF 200 signals is not within an expected range, which may be considered a test failure. For example, the Specification identifies the lowest selectable channel as 108.025 MHz and the highest selectable channel as 117.950 MHz. Accordingly, if the portable tester 300 detects a VHF frequency signal that is less than 108.025 MHz or above 117.950 MHz, the portable tester 300 may indicate a test failure for the VHF frequency test.

As another example, the Specification provides an upper and lower limit for both the horizontal and the vertical field strength of the VHF signal. During a test of the VHF power signal, the portable tester 300 may detect the field strength of the VHF signal. As the portable tester 300 moves towards the LGF 200, the upper limit of the field strength may be tested. Likewise, as the portable tester 300 moves away from the LGF 200, the lower limit of the field strength may be tested.

The portable tester 300 may be able to determine what part of the LGF 200 is causing a measured signal to fail. For example, the portable tester 300 may determine the location of the failure, such as in the VDB cabinet 206. In addition, the portable tester 300 may determine the type of failure, such as a loose connection within the LGF 200.

The signals may be verified at various locations around the airport or other test locations. Calibration of the portable tester 300 may be performed to adjust for location and environmental conditions.

The results of the tests performed by the portable tester 300 may be stored in the computer 304. Additionally, the results may be printed on either a printer included as part of the portable tester 300 or on a separate printer not included as part of the portable tester 300. Alternatively, the test results may be uploaded to another system, using either hard-wired or wireless transmission.

The results may include the tests performed, the results of the tests, type of failure, and location of failure. The results may also include details regarding the test conditions, such as date, time, location, weather, and the name of the person conducting the test.

Figure 4:
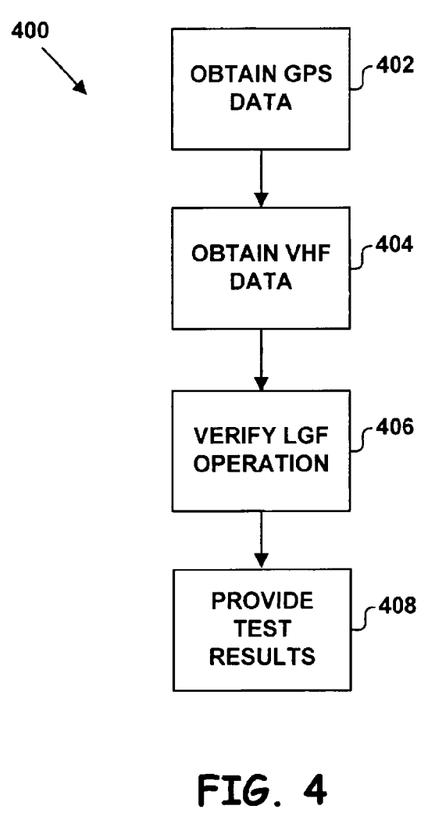
FIG. 4 is a flow chart diagram of a method of testing a LGF, according to an exemplary embodiment.

FIG. 4 is a flow chart diagram of a method 400 of testing a LGF. As shown in block 402, GPS data may be obtained. The receiver 302 may use the GPS antenna 308 to obtain GPS data from the plurality of satellites 102. The portable tester 300 may determine which satellites are transmitting data to the LGF 200.

As shown in block 404, VHF data is obtained. The receiver 302 may use the VHF antenna 306 to obtain VHF data from the LGF 200. The VHF data may include data regarding the frequency, integrity, and power of the VHF data broadcast signal being transmitted by the LGF 200. In addition, the receiver 302 may also capture the differential corrections and glidepath data that the LGF 200 would typically transmit to the aircraft 104.

Obtaining the GPS and VHF data may be performed at substantially the same time. Additionally, obtaining the GPS and VHF data may be performed for a period of time to collect data. For example, the GPS and VHF data may be collected throughout the test period or for a fixed period of time.

As shown in block 406, LGF operation may be verified. The portable tester 300 may verify at least the following LGF 200 signals: VHF frequency, VHF data integrity, VHF power, GPS satellites tracked, DGPS accuracy, DGPS position integrity, and glidepath. The signals may be verified at various locations around the airport or other test locations.

As shown in block 408, test results may be provided. The results of the tests performed by the portable tester 300 may be stored in the computer 304. The results may be printed on either a printer included as part of the portable tester 300 or on a separate printer not included as part of the portable tester 300. Additionally or alternatively, the test results may be uploaded to another system, using either hard-wired or wireless transmission.

The results may include the tests performed, the results of the tests, type of failure, and location of failure. The results may also include details regarding the test conditions, such as date, time, location, weather, and the name of the person conducting the test.

If the LGF 200 is not operating properly, the aircraft 104 may not receive proper differential corrections and glidepath information. As a result, the pilot might not have accurate information regarding the aircraft's position. This may result in landings that do not closely follow the prescribed glidepath, which could be disastrous. By using the portable tester 300, the LGF 200 can be tested after installation and when performing maintenance checks. Because the portable tester 300 can be easily moved around the airport, the LGF 200 can be tested for all runways located at the airport. After the portable tester 300 verifies that the LGF 200 is operational, a flight test may be performed to verify the operational status of the LAAS. This should limit the number of flight tests required, which reduces costs and limits LAAS down time.

It should be understood that the illustrated embodiments are exemplary only and should not be taken as limiting the scope of the present invention. While the illustrated embodiments were described using a commercial landing system, the embodiments may be used with any satellite-based navigation system. For example, the LGF portable tester may be used in conjunction with Joint Precision Approach and Landing System (JPALS), which is being developed by the Department of Defense. As another example, the LGF portable tester may also be used for satellite-based navigation systems for landing aircraft on aircraft carriers. As yet another example, the LGF portable tester may be used with Space Based Augmentation Systems (SBAS). Moreover, other satellite positioning systems besides GPS may be used, such as Russia's Global Navigation Satellite System (GLONASS). The claims should not be read as limited to the described order or elements unless stated to that effect. Therefore, all embodiments that come within the scope and spirit of the following claims and equivalents thereto are claimed as the invention.

We claim:

1. A portable tester for testing a satellite-based navigation system ground facility, comprising in combination:
    a receiver operable to receive signals from a plurality of satellites and broadcasts from a ground facility; and
    a computer operable to determine whether the ground facility is operational by comparing the satellite signals and the broadcasts obtained by the receiver with a test standard, wherein the computer determines a subsection of the around facility causing a test failure if the ground facility is not operational.

2. The system of claim 1, wherein the portable tester is assembled into an integrated package.

3. The system of claim 1, wherein the receiver is an integrated data link and Global Positioning System (GPS) receiver.

4. The system of claim 1, wherein the broadcasts are Very High Frequency (VHF) broadcasts.

5. The system of claim 1, wherein the receiver and the computer communicate using digital communication standard ARINC 429.

6. The system of claim 1, wherein the computer is a laptop computer.

7. The system of claim 1, wherein the computer is operable to tune the receiver.

8. The system of claim 1, wherein the computer is operable to select a glidepath.

9. The system of claim 1, wherein the computer simulates avionics in an aircraft.

10. The system of claim 1, wherein the computer displays information selected from a group consisting of differential mode, differential Global Positioning System (DGPS) position versus known position, Very High Frequency (VHF) data messages, and VHF error rates.

11. The system of claim 1, wherein the portable tester compares test signals selected from the group consisting of frequency, data integrity, power, satellites tracked, accuracy, position integrity, and glidepath with the test standard.

12. The system of claim 11, wherein the test standard includes a specific range of acceptable data for each of the test signals.

13. The system of claim 1, wherein the portable tester provides results selected from the group consisting of tests performed, test results, type of failure, and location of failure.

14. A portable tester for testing a satellite-based navigation system ground facility, comprising in combination:
    a data link operable to receive broadcasts from a ground facility;
    a receiver operable to receive data from a plurality of satellites; and
    a computer operable to determine whether the ground facility is operational by comparing test signals selected from the group consisting of frequency, data integrity, power, satellites tracked, accuracy, position integrity, and glidepath with a test standard, wherein the computer determines a subsection of the around facility causing a test failure if the around facility is not operational.

15. The system of claim 14, wherein the portable tester is assembled into an integrated package.

16. The system of claim 14, wherein the broadcasts are Very High Frequency (VHF) broadcasts.

17. The system of claim 14, wherein the data link, the receiver, and the computer communicate using digital communication standard ARINC 429.

18. The system of claim 14, wherein the computer is a laptop computer.

19. The system of claim 14, wherein the computer is operable to tune the receiver.

20. The system of claim 14, wherein the computer is operable to select a glidepath.

21. The system of claim 14, wherein the computer simulates avionics in an aircraft.

22. The system of claim 14, wherein the computer displays information selected from a group consisting of differential mode, differential Global Positioning System (DGPS) position versus known position, Very High Frequency (VHF) data messages, and VHF error rates.

23. The system of claim 14, wherein the test standard includes a specific range of acceptable data for each of the test signals.

24. The system of claim 14, wherein the portable tester provides results selected from the group consisting of tests performed, test results, type of failure, and location of failure.

25. A method of testing a satellite-based navigation system ground facility using a portable tester, comprising in combination:

receiving data from a plurality of satellites into the portable tester;

receiving data from a ground facility into the portable tester;

verifying the ground facility is operational by comparing the data from the plurality of satellites and the ground facility with a test standard, wherein the comparison is performed by the portable tester; and determining a subsection of the around facility causing a test failure if the ground facility is not operational.

26. The method of claim 25, wherein verifying that the ground facility is operational includes comparing test signals selected from the group consisting of frequency, data integrity, power, satellites tracked, accuracy, position integrity, and glidepath with the test standard.

27. The method of claim 26, wherein the test standard includes a specific range of acceptable data for each of the test signals.

28. The method of claim 25, further comprising providing test results selected from the group consisting of tests performed, test results, type of failure, and location of failure.

* * * * *

UNITED STATES PATENT AND TRADEMARK OFFICE
CERTIFICATE OF CORRECTION

PATENT NO. : 6,809,683 B2
DATED : October 26, 2004
INVENTOR(S) : Rodney L. Stangeland et al.

It is certified that error appears in the above-identified patent and that said Letters Patent is hereby corrected as shown below:

Title page,
Item [12], please replace "Strangeland" with Stangeland".
Item [57], ABSTRACT, please replace "opertional if not" with "operational. If not".
Item [75], Inventors, please replace "Strangeland" with "Stangeland".

Column 5,
Line 4, please replace "navigational. unit" with "navigational unit".

Column 8,
Lines 1, 48, and 49, please replace "around" with -- ground --.

Column 10,
Line 3, please replace "around" with -- ground --.

Signed and Sealed this

Nineteenth Day of April, 2005

JON W. DUDAS
*Director of the United States Patent and Trademark Office*